US012579798B2

(12) United States Patent
Cheng et al.

(10) Patent No.: US 12,579,798 B2
(45) Date of Patent: Mar. 17, 2026

(54) IMAGE PROCESSING METHOD AND APPARATUS

(71) Applicants:HUAWEI TECHNOLOGIES CO., LTD., Shenzhen (CN); University of Science and Technology of China, Hefei (CN)

(72) Inventors: Jie Cheng, Shenzhen (CN); Lei Jiang, Hangzhou (CN); Yang Cao, Hefei (CN); Zhengjun Zha, Hefei (CN)

(73) Assignees: Huawei Technologies Co., Ltd, Shenzhen (CN); University of Science and Technology of China, Hefei (CN)

( * ) Notice: Subject to any disclaimer, the term of this patent is extended or adjusted under 35 U.S.C. 154(b) by 556 days.

(21) Appl. No.: 18/064,132

(22) Filed: Dec. 9, 2022

(65) Prior Publication Data

US 2023/0104428 A1     Apr. 6, 2023

Related U.S. Application Data

(63) Continuation of application No. PCT/CN2021/099579, filed on Jun. 11, 2021.

(30) Foreign Application Priority Data

Jun. 12, 2020    (CN) .......................... 202010538341.X

(51) Int. Cl.
*G06N 3/045*      (2023.01)
*G06T 5/20*       (2006.01)
(Continued)

(52) U.S. Cl.
CPC ............... *G06V 10/82* (2022.01); *G06T 5/20* (2013.01); *G06T 5/60* (2024.01); *G06V 10/7715* (2022.01);
(Continued)

(58) Field of Classification Search
CPC .. G06V 10/82; G06V 10/7715; G06V 10/774; G06T 5/20; G06T 5/60;
(Continued)

(56) References Cited

U.S. PATENT DOCUMENTS

| | | | | |
|---|---|---|---|---|
| 2018/0173982 A1* | 6/2018 | Zink | ..................... | B60W 60/00 |
| 2022/0160228 A1* | 5/2022 | Leahy | ............... | A61B 5/14555 |

FOREIGN PATENT DOCUMENTS

| | | | | |
|---|---|---|---|---|
| CN | 109087258 A | * | 12/2018 | ............. G06N 3/045 |
| CN | 109726743 A | * | 5/2019 | |

OTHER PUBLICATIONS

Wu et al., "Integration Field Beyond the Classical Visual Receptive Field," Chinese Journal of Neuroscience, vol. 1, No. 2, Shanghai Institute of Physiology, Chinese Academy of Sciences, Shanghai 200031, total 17 pages (Jun. 25, 1994). With an English translation.

* cited by examiner

*Primary Examiner* — Stephen R Koziol
*Assistant Examiner* — Dylan J Sherrillo
(74) *Attorney, Agent, or Firm* — Leydig, Voit & Mayer, Ltd.

(57) ABSTRACT

An image processing method and apparatus are provided. The method includes: after image data of a target image is received, performing processing on the image data based on a network parameter to obtain enhanced image feature data of the target image; and performing processing on the target image based on the enhanced image feature data. The target image is a low-quality image, and the network parameter is used to indicate a correspondence between feature data of a low-quality image and feature data of a clear image. According to the application, a processing effect of a low-quality image is approved.

20 Claims, 10 Drawing Sheets

(51) Int. Cl.

| | |
|---|---|
| *G06T 5/60* | (2024.01) |
| *G06V 10/77* | (2022.01) |
| *G06V 10/774* | (2022.01) |
| *G06V 10/82* | (2022.01) |

(52) U.S. Cl.
CPC .. G06V 10/774 (2022.01); *G06T 2207/20081* (2013.01); *G06T 2207/20084* (2013.01)

(58) Field of Classification Search
CPC . G06T 2207/20081; G06T 2207/20084; G06T 2207/10004; G06T 2207/10016; G06T 2207/10024; G06T 5/00; G06N 3/045; G06N 3/084; G06N 3/04; G06N 3/08
See application file for complete search history.

Receive image data of a target image — 302

Perform processing on the image data based on a network parameter to obtain enhanced image feature data of the target image — 303

Perform processing on the target image based on the enhanced image feature data — 310

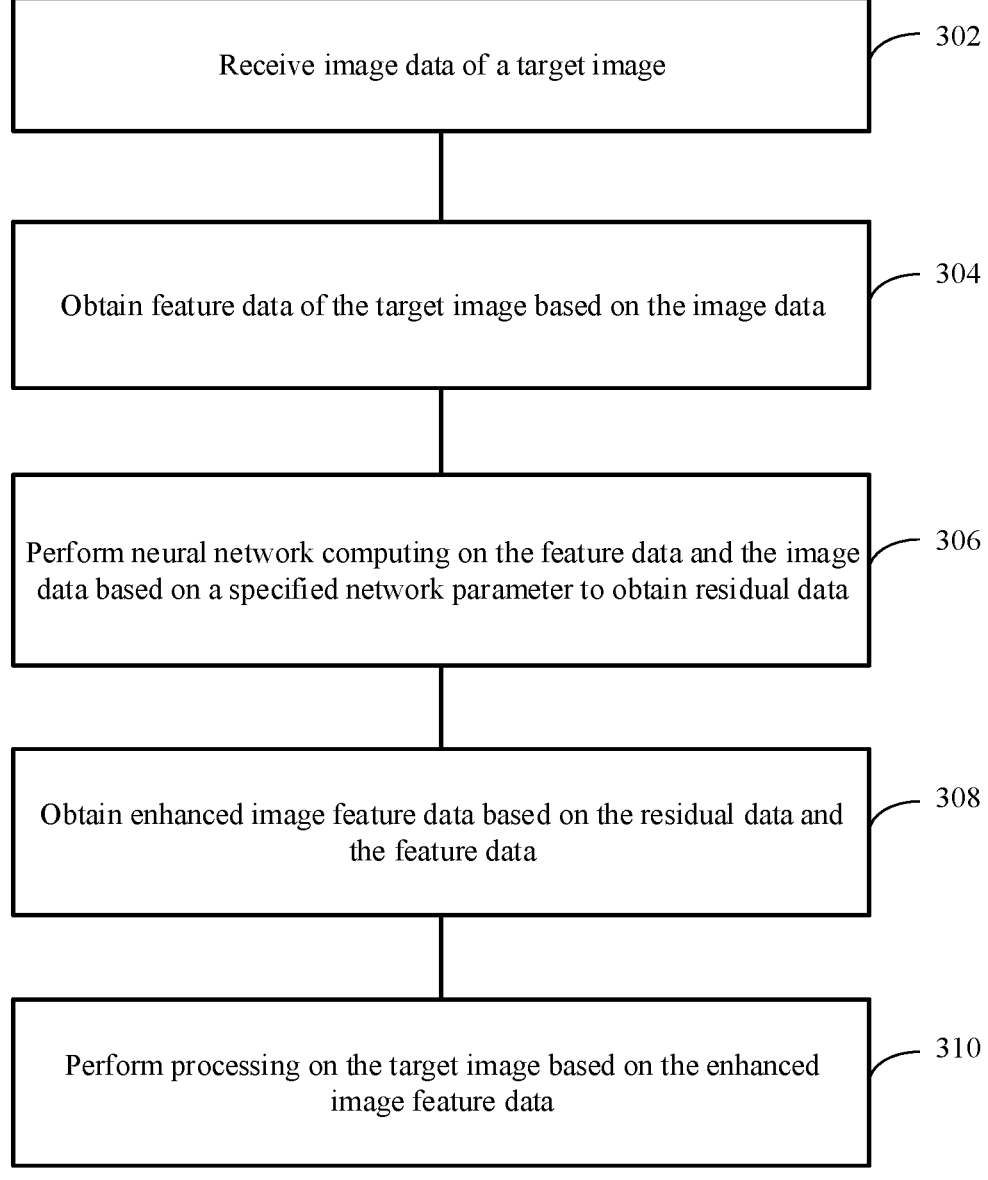

Receive image data of a target image    302

Obtain feature data of the target image based on the image data    304

Perform neural network computing on the feature data and the image data based on a specified network parameter to obtain residual data    306

Obtain enhanced image feature data based on the residual data and the feature data    308

Perform processing on the target image based on the enhanced image feature data    310

FIG. 3B

IMAGE PROCESSING METHOD AND APPARATUS

CROSS-REFERENCE TO RELATED APPLICATIONS

This application is a continuation of International Application No. PCT/CN2021/099579, filed on Jun. 11, 2021, which claims priority to Chinese Patent Application No. 202010538341.X, filed on Jun. 12, 2020. The disclosures of the aforementioned applications are hereby incorporated by reference in their entireties.

TECHNICAL FIELD

Embodiments of this application relate to the field of computer technologies, and in particular, to an image processing method and apparatus.

BACKGROUND

In recent years, with rapid development of deep learning technologies, breakthroughs have been made in research on the high-level vision field represented by issues such as image classification, object recognition, and semantic segmentation. These breakthroughs are made largely owing to emergence of large-scale image databases such as ImageNet and PASCAL VOC. However, images in these databases are usually clear and lossless images with high quality. In an actual imaging process, interference factors such as light (low illumination, overexposure, and the like), weather factors (rain, snow; fog, and the like), noise, and motion destroy structures and statistical information of images, resulting in low-quality images. Therefore, in actual vision application, a computer vision system likely needs to process a low-quality image.

In a process of processing a low-quality image, a common method is to first perform enhancement processing on a degraded image by using an image enhancement algorithm to improve image quality of the low-quality image, and then to perform recognition and other processing on an image with improved quality. However, an existing image enhancement algorithm mainly aims to obtain an enhanced image with a good visual perceptual effect and is intended for human objects. Such an algorithm cannot ensure that a computer network can extract integral structures or statistical features from enhanced images, and therefore has low recognition precision.

SUMMARY

This application provides an image processing method and apparatus, to improve a processing effect of a low-quality image.

According to a first aspect, an embodiment of the application provides an image processing method. According to the method, after image data of a target image is received, processing may be performed on the image data based on a network parameter to obtain enhanced image feature data of the target image; and processing may be performed on the target image based on the enhanced image feature data. The target image is a low-quality image, and the network parameter is used to indicate a correspondence between feature data of a low-quality image and feature data of a clear image.

From the description of the image processing method provided in this embodiment of the application, it can be learned that, in this embodiment of the application, no pre-processing is performed on the low-quality image itself. Instead, in an image processing process, processing is performed on the image data of the low-quality image by using the specified network parameter to obtain the enhanced image feature data of the low-quality image, and processing is performed on the low-quality image based on the enhanced image feature data. The network parameter reflects the correspondence between feature data of a low-quality image and feature data of a clear image. In other words, in the processing process, an association between a feature of a low-quality image and a feature of a clear image is used to perform processing on a feature of the low-quality target image. Therefore, the feature data of the low-quality image can be enhanced, network recognizability of the feature data of the target image can be improved, and a processing effect of the low-quality image can be improved, for example, recognition precision of the low-quality image can be improved.

With reference to the first aspect, in a first possible implementation, in a process of obtaining the enhanced image feature data of the target image, feature data of the target image may be obtained based on the image data, neural network computing may be performed on the feature data and the image data based on the network parameter to obtain residual data, and further the enhanced image feature data of the target image may be obtained based on the residual data and the feature data. The feature data is feature data obtained by performing computing on the image data by using N layers of neural networks, and N is greater than 0 and less than a preset threshold. The residual data is used to indicate a deviation between the feature data of the target image and feature data of a clear image.

According to this manner, because a structure of a non-classical receptive field in a retina is referenced in the processing process and a light sensation principle of bipolar cells of the retina is simulated, there is a function of enhancing high-frequency information in the target image and maintaining low-frequency information in the target image, so that the enhanced image feature data is more easily recognized or extracted, and a processing effect is good, for example, recognition precision of the low-quality image can be improved. In addition, robustness (or stability) of the network can be made strong. Further, in this embodiment of the application, processing is performed on the low-quality image by using a feature drifting attribute of an image. Therefore, the processing process does not need to be monitored by using a semantic signal (used to indicate image content), and a quantity of network parameters is small.

With reference to the foregoing implementations, in a possible implementation, that neural network computing may be performed on the feature data and the image data based on the network parameter includes: center-surround convolution computing is performed on the feature data and the image data based on the network parameter. According to this manner, the light sensation principle of bipolar cells of the retina can be simulated, so that the processing effect of the image is better.

With reference to any one of the foregoing implementations, in still another possible implementation, that neural network computing may be performed on the feature data and the image data based on the specified network parameter includes: at least first-level center-surround convolution computing, second-level center-surround convolution computing, and third-level center-surround convolution computing are performed on the feature data and the image data based on the specified network parameter. According to this manner, the structure of the non-classical receptive field in the retina and the light sensation principle of bipolar cells of the retina can be simulated, to improve image recognition precision and an image recognition effect.

With reference to any one of the foregoing implementations, in still another possible implementation, input data of the first-level center-surround convolution computing includes the feature data and the image data, input data of the second-level center-surround convolution computing includes a computing result of the first-level center-surround convolution computing, and input data of the third-level center-surround convolution computing includes a computing result of the second-level center-surround convolution computing.

With reference to any one of the foregoing implementations, in still another possible implementation, the residual data is obtained based on the computing result of the first-level center-surround convolution computing, the computing result of the second-level center-surround convolution computing, and a computing result of the third-level center-surround convolution computing.

With reference to any one of the foregoing implementations, in still another possible implementation, the first-level center-surround convolution computing is used to simulate a response of a central region in a retina of a human eye to the target image, the second-level center-surround convolution computing is used to simulate a response of a surrounded region of the retina of the human eye to the target image, and the third-level center-surround convolution computing is used to simulate a response of a marginal region of the retina of the human eye to the target image.

With reference to any one of the foregoing implementations, in still another possible implementation, the first-level center-surround convolution computing includes: performing a first convolution operation on the feature data and the image data based on a first convolution kernel to obtain a first intermediate result, where a central-region weight of the first convolution kernel is 0; performing a second convolution operation on the feature data and the image data based on a second convolution kernel to obtain a second intermediate result, where the second convolution kernel includes only a central-region weight, and the first convolution kernel and the second convolution kernel have a same size; and obtaining the computing result of the first-level center-surround convolution based on the first intermediate result and the second intermediate result.

With reference to any one of the foregoing implementations, in still another possible implementation, the second-level center-surround convolution computing includes: performing a third convolution operation on the computing result of the first-level center-surround convolution based on a third convolution kernel to obtain a third intermediate result, where a central-region value of the third convolution kernel is 0; performing a fourth convolution operation on the computing result of the first-level center-surround convolution based on a fourth convolution kernel to obtain a fourth intermediate result, where the fourth convolution kernel includes only a central-region weight, and the third convolution kernel and the fourth convolution kernel have a same size; and obtaining the computing result of the second-level center-surround convolution based on the third intermediate result and the fourth intermediate result.

With reference to any one of the foregoing implementations, in still another possible implementation, the third-level center-surround convolution computing includes: performing a fifth convolution operation on the computing result of the second-level center-surround convolution based on a fifth convolution kernel to obtain a fifth intermediate result, where a central-region weight of the fifth convolution kernel is 0; performing a sixth convolution operation on the computing result of the second-level center-surround convolution based on a sixth convolution kernel to obtain a sixth intermediate result, where the sixth convolution kernel includes only a central-region weight, and the fifth convolution kernel and the sixth convolution kernel have a same size; and obtaining the computing result of the third-level center-surround convolution based on the fifth intermediate result and the sixth intermediate result.

With reference to any one of the foregoing implementations, in still another possible implementation, the method is executed by a neural network device, and the network parameter is obtained by training.

According to a second aspect, this application provides an image recognition apparatus. The recognition apparatus includes a function module configured to implement the image processing method in any one of the first aspect or the implementations of the first aspect.

According to a third aspect, this application provides an image recognition apparatus, including a neural network configured to implement the image processing method in any one of the first aspect or the implementations of the first aspect.

According to a fourth aspect, this application further provides a computer program product, including program code. Instructions included in the program code are executed by a computer, to implement the image processing method in any one of the first aspect or the implementations of the first aspect.

According to a fifth aspect, this application further provides a computer-readable storage medium. The computer-readable storage medium is configured to store program code. Instructions included in the program code are executed by a computer, to implement the image processing method in any one of the first aspect or the implementations of the first aspect.

BRIEF DESCRIPTION OF DRAWINGS

To describe the technical solutions in embodiments of the application or in the conventional technology more clearly, the following briefly describes the accompanying drawings for describing embodiments. It is clear that the accompanying drawings in the following description show merely some embodiments of the application.

FIG. 3B is a flowchart of another image processing method according to an embodiment of the application:

DESCRIPTION OF EMBODIMENTS

To make persons skilled in the art understand the solutions in the application better, the following clearly describes the technical solutions in embodiments of the application with reference to the accompanying drawings in embodiments of the application. It is clear that the described embodiments are a part rather than all of embodiments of the application.

Figure 1:
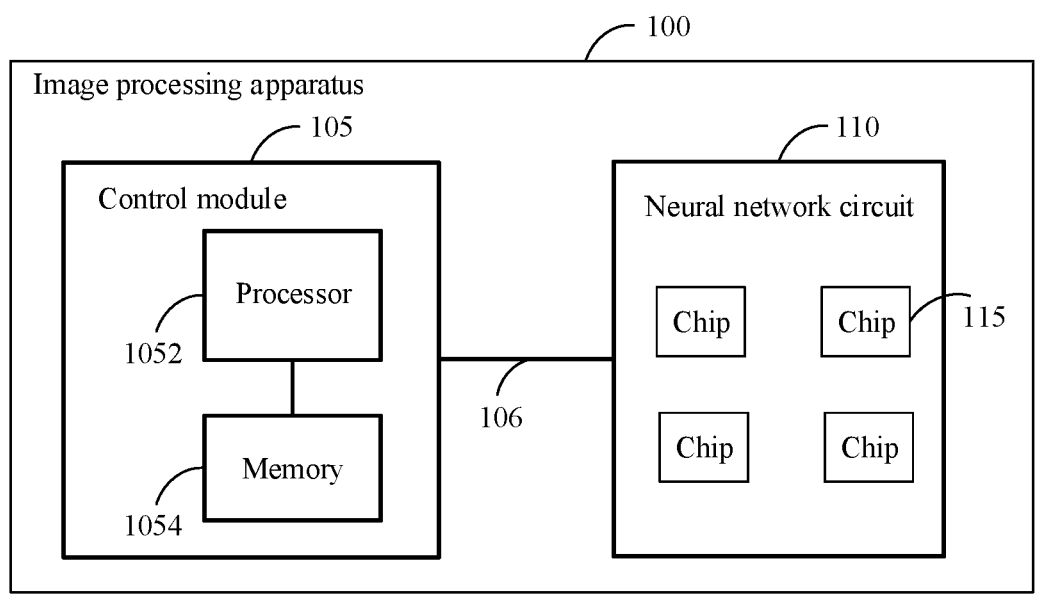
FIG. 1 is a schematic diagram of a structure of an image processing apparatus according to an embodiment of the application.

FIG. 1 is a schematic diagram of a structure of an image processing apparatus according to an embodiment of the application. As shown in FIG. 1, an image processing apparatus 100 may include a control module 105 and a neural network circuit 110. The control module 105 may include a processor 1052 and a memory 1054. The processor 1052 is an operation core and control core (control unit) of the control module 105. The processor 1052 may include one or more processor cores. The processor 1052 may be an ultra-large-scale integrated circuit. An operating system and other software programs are installed in the processor 1052, so that the processor 1052 can implement access to the memory 1054, a cache, a magnetic disk, and a peripheral device (for example, the neural network circuit in FIG. 1). It can be understood that, in this embodiment of the application, a core in the processor 1052 may be, for example, a central processing unit (CPU), or may be another application-specific integrated circuit (ASIC).

The memory 1054 may be used as a cache of the processor 1052. The memory 1054 may be connected to the processor 1052 by using a double data rate (DDR) bus. The memory 1054 is usually configured to store various running software in the operating system, input and output data, information exchanged with an external memory, and the like. To increase an access speed of the processor 1052, the memory 1054 needs to have an advantage of a high access speed. In a conventional computer system architecture, a dynamic random access memory (DRAM) is usually used as the memory 1054. The processor 1052 can access the memory 1054 at a high speed by using a memory controller (not shown in FIG. 1), and perform a read operation and a write operation on any storage unit in the memory 1054.

The neural network circuit 110 is configured to perform artificial neural network computing. Persons skilled in the art can know that, an artificial neural network (ANN), referred to as a neural network (NN) or a neural-like network for short, is a mathematical model or a computing model that imitates a structure and a function of a biological neural network (a central nervous system, especially a brain, of an animal) in the fields of machine learning and cognitive science, and is configured to perform estimation or approximation on a function. The artificial neural network may include neural networks such as a convolutional neural network (CNN), a deep neural network (DNN), and a multilayer perceptron (MLP). A neural network is usually used for image recognition, image classification, speech recognition, and the like.

In this embodiment of the application, the neural network circuit 110 may include one or more neural network chips 115 (which may be referred to as chips 115 for short)

configured to perform artificial neural network computing. The one or more chips 115 are configured to perform neural network computing. The neural network circuit 110 is connected to the control module 105. As shown in FIG. 1, the neural network circuit 110 may be connected to the control module 105 through a connection bus 106. The connection bus 106 may be a peripheral component interconnect express (PCIE) bus, or may be another connection line (for example, a network cable). Herein, a manner of connecting the neural network circuit 110 to the control module 105 is not limited. With the control module 105 connected to the neural network circuit 110, the processor 1052 may access the neural network circuit 110 by using the connection bus 106. For example, after receiving to-be-processed image data by using an interface (not shown in FIG. 1), the processor 1052 may send the to-be-processed image data to the chip 115 in the neural network circuit 110 by using the connection bus 106, and receive a processing result of the neural network circuit 110 by using the connection bus 106. In addition, the control module 105 may also monitor an operating status of the neural network circuit 110 by using the connection bus 106.

Figure 2:
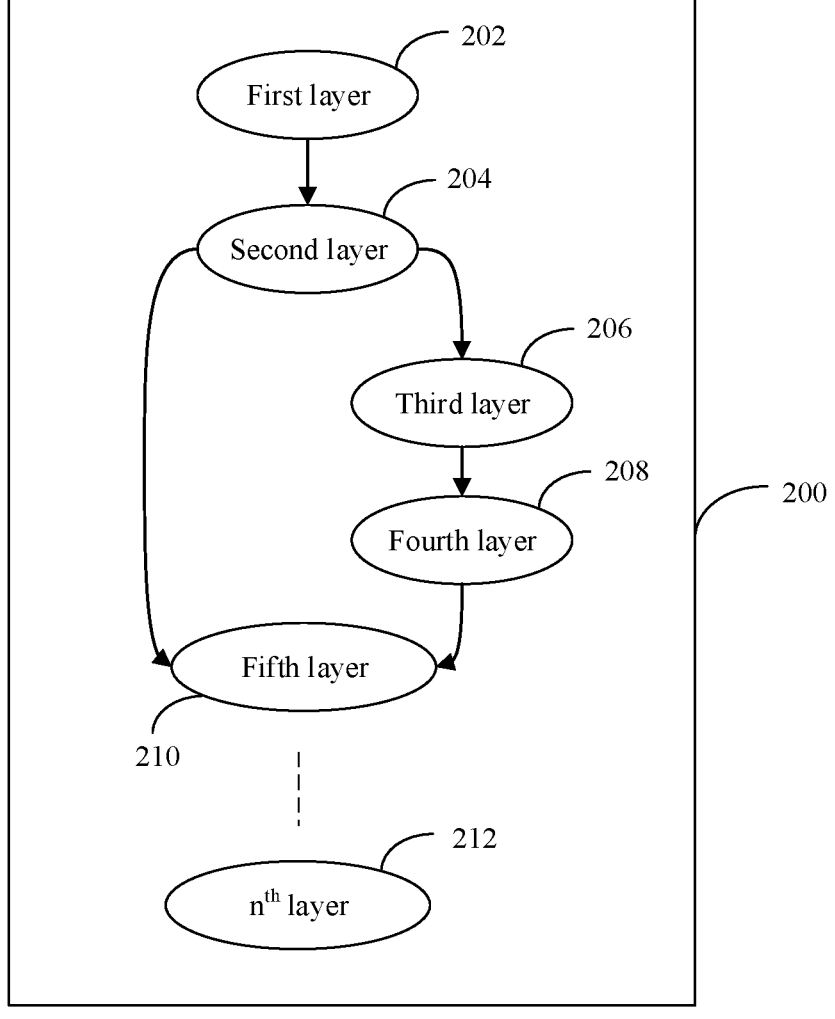
FIG. 2 is a schematic diagram of neural network layers in a neural network system according to an embodiment of the application.

A neural network system may include a plurality of neural network layers. In this embodiment of the application, the neural network layer is a logical layer concept. One neural network layer means that one neural network operation needs to be performed. The neural network layers may include a convolutional layer, a pooling layer, and the like. As shown in FIG. 2, the neural network system may include n neural network layers (which may also be referred to as n layers of neural networks), n is an integer greater than or equal to 2. FIG. 2 shows some of the neural network layers in the neural network system. As shown in FIG. 2, the neural network system may include a first layer 202, a second layer 204, a third layer 206, a fourth layer 208, a fifth layer 210, . . . , and an $n^{th}$ layer 212. The first layer 202 may perform a convolution operation, the second layer 204 may perform a pooling operation on output data of the first layer 202, the third layer 206 may perform a convolution operation on output data of the second layer 204, the fourth layer 208 may perform a convolution operation on an output result of the third layer 206, the fifth layer 210 may perform a summation operation on the output data of the second layer 204 and output data of the fourth layer 208, and the like. It can be understood that. FIG. 2 is merely a simple example and description of the neural network layers in the neural network system, and does not limit a specific operation of each layer of neural network. For example, the fourth layer 208 may alternatively perform a pooling operation, and the fifth layer 210 may alternatively perform a convolution operation, a pooling operation, or another neural network operation.

In actual application, when processing is performed on an image by using the neural network system, computing of a plurality of neural network layers may be performed on image data, to finally obtain a processing result of the image. In this embodiment of the application, a quantity of neural network chips that perform neural network computing is not limited. It should be noted that. FIG. 1 is merely schematic illustration of an image processing apparatus. The image processing apparatus in this embodiment of the application may also be a computing device that can perform neural network computing, such as a server or a computer. The computing device may include a computing node that is configured to perform neural network computing, such as a central processing unit (CPU) or a graphics processing unit (GPU). The computing device may not include the neural network chip shown in FIG. 1 that is specifically configured to perform neural network computing. In this embodiment of the application, a specific structure of the image processing apparatus is not limited, provided that the image processing apparatus includes a neural network that can implement an image processing method provided in embodiments of the application. In this embodiment of the application, apparatuses including a neural network, such as a computer, a server, and the image processing apparatus shown in FIG. 1, each may also be referred to as a neural network device or a neural network system. In addition, in this embodiment of the application, image processing may include image processing manners such as image classification, object recognition, and semantic segmentation. The image processing method provided in embodiments of the application may be applied to automated driving, photographing by a smartphone, an intelligent surveillance system, and another scenario, to improve processing precision of the image processing apparatus for a low-quality image.

Figure 3A:
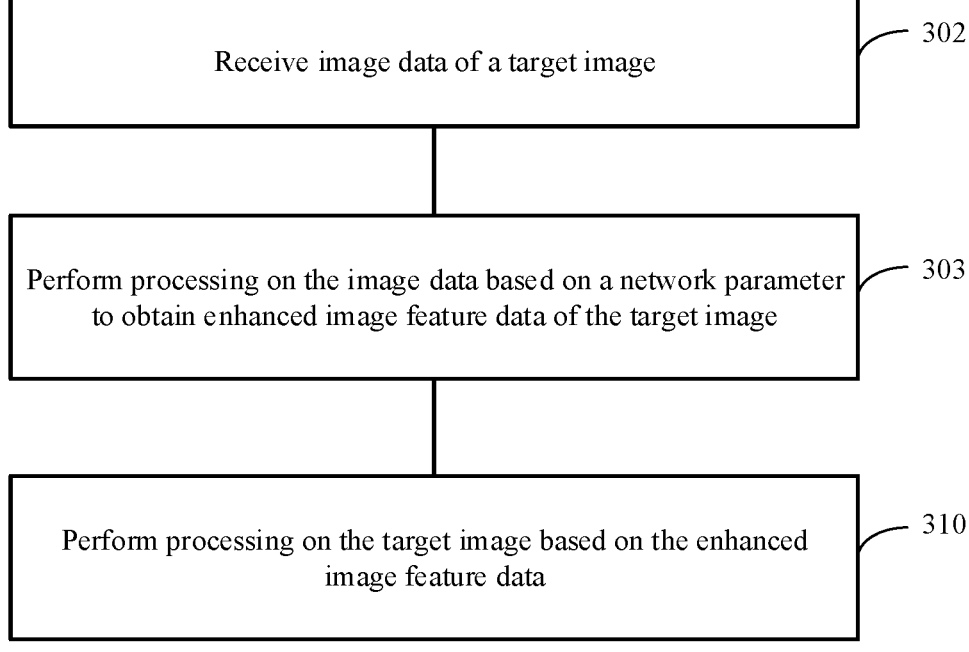
FIG. 3A is a flowchart of an image processing method according to an embodiment of the application.
Figure 4:
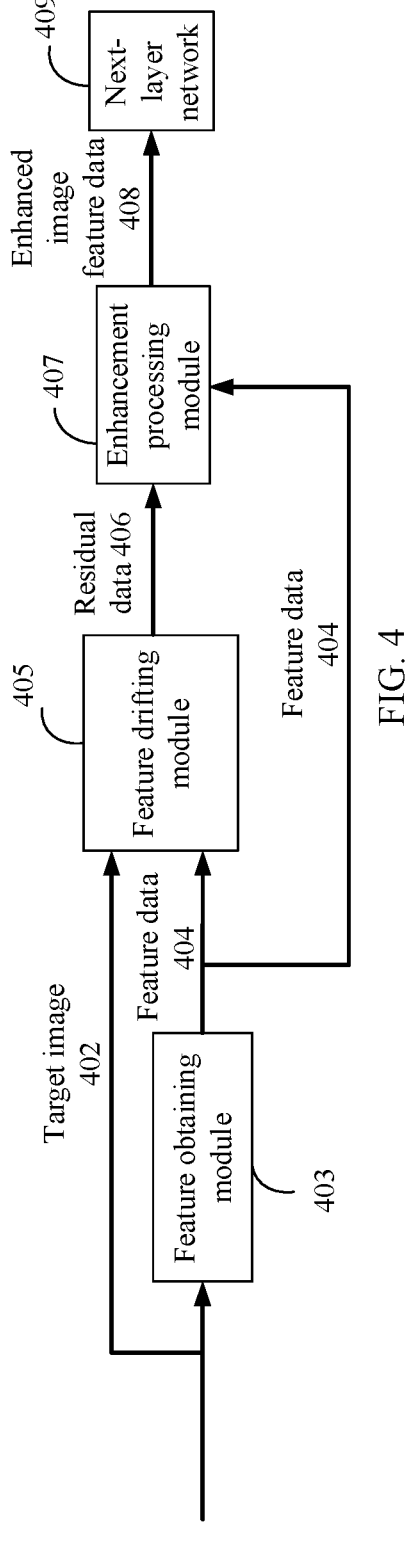
FIG. 4 is a schematic diagram of a signal of an image processing method according to an embodiment of the application.

With reference to FIG. 3A, FIG. 3B, and FIG. 4, the following describes in detail how the image processing apparatus provided in this embodiment of the application performs processing on a low-quality image. FIG. 3A is a flowchart of an image processing method according to an embodiment of the application. FIG. 3B is a flowchart of another image processing method according to an embodiment of the application. A difference between FIG. 3A and FIG. 3B lies in that, some steps in FIG. 3B are specific schematic illustration of some steps in FIG. 3A. FIG. 4 is a schematic diagram of a signal of an image processing method according to an embodiment of the application. The image processing methods shown in FIG. 3A and FIG. 3B both may be performed by the neural network circuit 110 in FIG. 1. In a process of performing processing on an image by the image processing apparatus 100, neural network computing is performed on input image data mainly by using the neural network chip 115 in the neural network circuit 110. For example, the neural network circuit 110 may perform a plurality of types of neural network computing such as convolution and pooling on the image data, to obtain an image processing result. With reference to FIG. 3A, FIG. 3B, and FIG. 4, the image processing method provided in embodiments of the application may include the following steps.

In step 302, image data of a target image is received, where the target image is a low-quality image. In this embodiment of the application, the low-quality image refers to a low-quality image generated because inherent color and structure information of an image is destroyed due to interference from factors such as light (for example, low illumination and overexposure), weather (for example, rain, snow; and fog), and relative motion of an object in an image imaging process. Briefly, the low-quality image is an image whose image quality is lower than a preset threshold. As shown in FIG. 4, when image processing is needed, the chip 115 in the neural network circuit 110 may receive image data that is of a to-be-processed target image 402 and that is sent by the processor 1052. It can be understood that, in actual application, the low-quality image may be a pre-collected image in an image database. Alternatively, the image processing apparatus may be connected to an image collection system, to perform processing on an image collected in real time by the image collection system. It should be noted that, in this embodiment of the application, the target image may be a picture, a video, or the like.

In step 303, processing is performed on the image data based on a network parameter to obtain enhanced image feature data of the target image. The network parameter is used to indicate a correspondence between feature data of a low-quality image and feature data of a clear image. In this embodiment of the application, a trained network parameter is specified in the neural network system. The network parameter is obtained after training based on a plurality of low-quality images and clear images. Therefore, after it is determined that the input image data is image data of a low-quality image, computing may be performed on the input image data based on the specified network parameter, so that feature data of the target image can be enhanced to obtain the enhanced image feature data. With reference to FIG. 3B, the following describes in detail how to obtain the enhanced image feature data of the target image.

Refer to step 304 in FIG. 3B. After the image data of the target image is received in step 302, the feature data of the target image may be obtained based on the image data. The feature data is data obtained by performing computing on the image data by using N layers of neural networks, and N is greater than 0 and less than a preset threshold. In this embodiment of the application, the feature data of the target image may include shallow-layer feature data of the target image. The shallow-layer feature data may include data used to indicate features such as a color, a structure, and a texture of an image. Specifically, the feature data of the target image may be obtained by the chip 115 in the neural network circuit 110 by performing computing by using N layers of neural networks. In other words, the feature data may be feature data (feature map) output from computing performed by the neural network circuit 110 by using the first N layers of neural networks. A value of N may be set based on an actual requirement. For example, N may be less than 5 or 10. This is not limited herein. For ease of schematic illustration, computing performed by the chip 115 by using the N layers of neural networks is referred to as a feature obtaining module 403 in FIG. 4. For example, in actual application, feature data output by any one of the first five neural network layers in the neural network computing performed by the neural network circuit 110 may be used as the feature data of the target image. For example, the neural network circuit 110 needs to perform neural network computing of the n layers shown in FIG. 2. In this case, the feature data output by the first layer 202, the second layer 204, the third layer 206, the fourth layer 208, or the fifth layer 210 may be used as the feature data of the target image. It should be noted that the feature obtaining module 403, a feature drifting module 405, an enhancement processing module 407, and a next-layer neural network 409 shown in FIG. 4 are all logical concepts, and are used to indicate neural network computing performed by the neural network circuit 110 in FIG. 1.

Refer to FIG. 3B, in step 306. Neural network computing is performed on the feature data and the image data based on the specified network parameter to obtain residual data. The residual data is used to indicate a deviation between the feature data of the target image and feature data of a clear image. The network parameter is used to indicate the correspondence between feature data of a low-quality image and feature data of a clear image. The feature data of the clear image includes feature data of clear images used in a training process. The feature data of the clear image may include shallow-layer feature data of the clear image. As shown in FIG. 4, after feature data 404 is obtained, computing may be performed on the feature data 404 and the image data of the target image 402 by using the feature drifting module (also be referred to as Feature De-drifting Module) 405, to obtain residual data 406. It should be noted that the feature drifting module 405 is also neural network computing performed in the neural network circuit 110. In this embodiment of the application, the feature de-drifting module 405 is a neural network computing module that is based on a non-classical receptive field of adaptive antagonistic convolution.

In a process of implementing the application, it is found from research that, in different images, feature representations of clear image blocks with a similar structure and feature representations of low-quality image blocks corresponding to the clear image blocks share a same feature drifting pattern, and the pattern is independent of image content (semantic information). Specifically, shallow-layer features of all the clear image blocks with a similar structure are aggregated. Similarly, shallow-layer features of all the low-quality image blocks corresponding to the clear image blocks are also aggregated. In addition, this aggregation effect is independent of image content. In this embodiment of the application, based on such a finding, a correspondence is established between feature data of a low-quality image (which may be referred to as a low-quality feature for short) and feature data of a clear image (which may be referred to as a clear feature for short), so as to improve processing precision of a low-quality image based on the correspondence.

To better learn the correspondence between a low-quality feature and a clear feature, this embodiment of the application proposes a feature drifting network based on a non-classical receptive field (nCRF) mechanism of a retina of a human eye, and proposes a "center-surround convolution mechanism" based on a light sensation principle of bipolar cells. A receptive field is a basic structure and functional unit for information processing of a visual system. A retinal ganglion has a concentric antagonistic classical receptive field (CRF), which has a spatial integration feature of processing brightness contrast information of image regions and extract edge information of an image. A non-classical receptive field is a large region outside the classical receptive field. Stimulating this region alone cannot directly induce a cellular response, but enables a modulation function on a response caused by stimulation in the classical receptive field. A non-classical receptive field of ganglion cells of the retina is mainly de-inhibitive, and therefore can compensate for a low-frequency information loss caused by a classical receptive field to some extent, so as to transfer brightness gradient information of an image region and display a slow change in brightness on a large-area surface while maintaining a boundary enhancement function. Therefore, it can be learned that, the non-classical receptive field greatly broadens a processing range of visual cells, providing a neural basis for integrating and detecting complex graphs in a large range. The non-classical receptive field in the retina of the human eye includes a plurality of mutually antagonistic sub-regions, and the sub-regions cooperate with each other to implement a function of enhancing a high frequency while maintaining a low frequency, thereby helping the human eye better distinguish between external objects. Antagonism refers a phenomenon that one substance (or process) is suppressed by another substance (or process).

Figure 5:
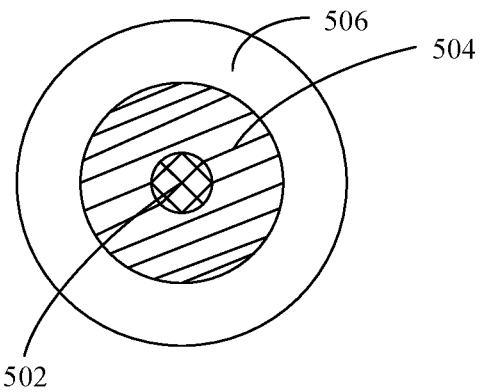
FIG. 5 is a schematic diagram of a structure of a non-classical receptive field in a retina of a human eye according to an embodiment of the application.

FIG. 5 is a schematic diagram of a structure of a non-classical receptive field in a retina of a human eye according to an embodiment of the application. As shown in FIG. 5, the non-classical receptive field in the retina of the human eye may include three regions: a central region 502, a surrounded region 504, and a marginal region 506. A mathematical expression of the non-classical receptive field in the retina of the human eye may be:

$$f = A_1(I * G(\sigma_1)) + A_2(I * G(\sigma_2)) + A_3(I * G(\sigma_3)) \text{ formula} \quad (1)$$

In the formula (1), $G_1 \sim G_3$ represent three Gaussian convolution kernels with different bandwidths:

$$G(\sigma) = \frac{1}{\sqrt{2\pi\sigma^2}} \exp\left(-\frac{x^2 + y^2}{2\sigma}\right) \quad \text{formula (2)}$$

$A_1 \sim A_5$ represent weighting coefficients of the central region, the surrounded region, and the marginal region, respectively. Variances $\sigma_1 \sim \sigma_3$ determine bandwidths of three Gaussian functions. The formula (1) may be expressed in the following form:

$$f = A_1(I * G_1) + A_2((I * G_1) * G_2') + A_3(((I * G_1) * G_2') * G_3') \text{ formula} \quad (3)$$

In this formula, $$G_2' = \sqrt{\sigma_2^2 - \sigma_1^2}, \text{ and } G_3' = \sqrt{\sigma_3^2 - \sigma_2^2}.$$

According to the formula (3), it can be seen that, an output result of the first convolution item may be used as an input of the second convolution item, and an output result of the second convolution item may also be used as an input of the third convolution item.

To simulate an antagonistic mechanism in the foregoing non-classical receptive field and enhance a low-quality feature, the application proposes a feature drifting module. The module includes a plurality of levels of structures, each of which includes one or more convolutional layers. A set of low-quality feature maps is input, and each level of sub-network in the feature drifting module can output a set of results. Finally, a plurality of sets of output results are weighted and fused to obtain final residual data.

Figure 6:
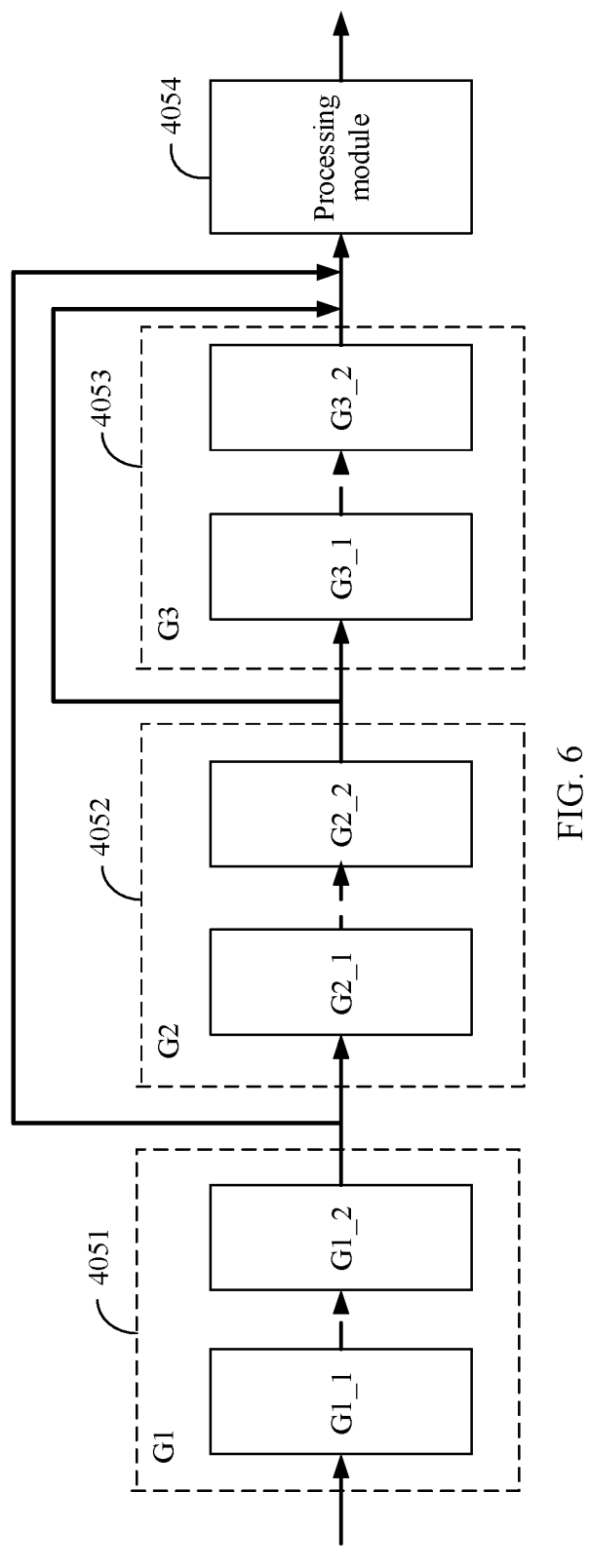
FIG. 6 is a schematic diagram of a structure of a feature drifting module according to an embodiment of the application.

FIG. 6 is a schematic diagram of a structure of the feature drifting module 405 according to an embodiment of the application. For example, the feature drifting module 405 includes three levels of convolutional modules. As shown in FIG. 6, the feature drifting module 405 may include three levels of convolutional modules: G1 4051, G2 4052, and G3 4053. The feature drifting module 405 may further include a processing module 4054. The convolutional module G1 4051 is configured to simulate a function of the central region 502 of the non-classical receptive field in the retina of the human eye shown in FIG. 5. The convolutional module G2 4052 is configured to simulate a function of the surrounded region 504 shown in FIG. 5. The convolutional module G3 4053 is configured to simulate a function of the marginal region 506 shown in FIG. 5. Each level of convolutional module may be implemented by using one or more convolutional layers. In FIG. 6, an example in which one level of convolution includes two convolutional layers is used for schematic illustration. For example, G1 4051 includes convolutional layers G1_1 and G1_2, G2 4052 includes convolutional layers G2_1 and G2_2, and G3 4053 includes convolutional layers G3_1 and G3_2. The processing module 4054 is configured to weight results output by the three convolutional modules G1 4051, G2 4052, and G3 4053, and then perform concatenation processing.

To better enhance high-frequency information in a low-quality image, this embodiment of the application proposes "center-surround convolution" based on the light sensation principle of bipolar cells. A bipolar neuron is a neuron that has one process at each of two ends of its own cell body. One process is distributed to a surrounding sensory receptor (also referred to as a peripheral process or a dendrite process) and the other process enters a central part (also referred to as a central process or an axon process). In the retina, a bipolar neuron connects a visual cell to a ganglion cell, and plays a longitudinal connection function. Bipolar neurons may be divided into two types: on-center and off-center. On-center indicates an on-center excitation type. A bipolar neuron of this type is excited when a center receives a light stimulation and is inhibited when a periphery receives a light stimulation. Off-center indicates an off-center cell. The off-center cell is excited when a stimulation is stopped in a central region, and is inhibited when light is stopped at a periphery.

In this embodiment of the application, based on the light sensation principle of bipolar cells in the retina of the human eye, each convolutional module in FIG. 6 needs to perform computing according to the "center-surround convolution mechanism". Specifically, each convolutional layer in each convolutional module needs to perform two types of convolution in parallel: center convolution and surround convolution. For example, for the convolutional modules G1 4051, G2 4052, and G3 4053 shown in FIG. 6, each convolutional module includes two convolutional layers, and each convolutional layer needs to perform two types of convolution: center convolution and surround convolution. It can be understood that, when one convolutional module includes a plurality of convolutional layers, input data of a latter convolutional layer includes a computing result of a former convolutional layer, and a computing result of a last convolutional layer in one convolutional module is a result of the convolutional module. The convolutional module G1 is used as an example. After the convolutional layer G1_1 performs surround convolution and center convolution on input data to obtain a computing result, the computing result may be input to the convolutional layer G1_2. The convolutional layer G1_2 continues to perform surround convolution and center convolution on the computing result of the convolutional layer G1_1 based on a specified network parameter. A computing result of the convolutional layer G1_2 is a computing result of the convolutional module G1.

Figure 7:
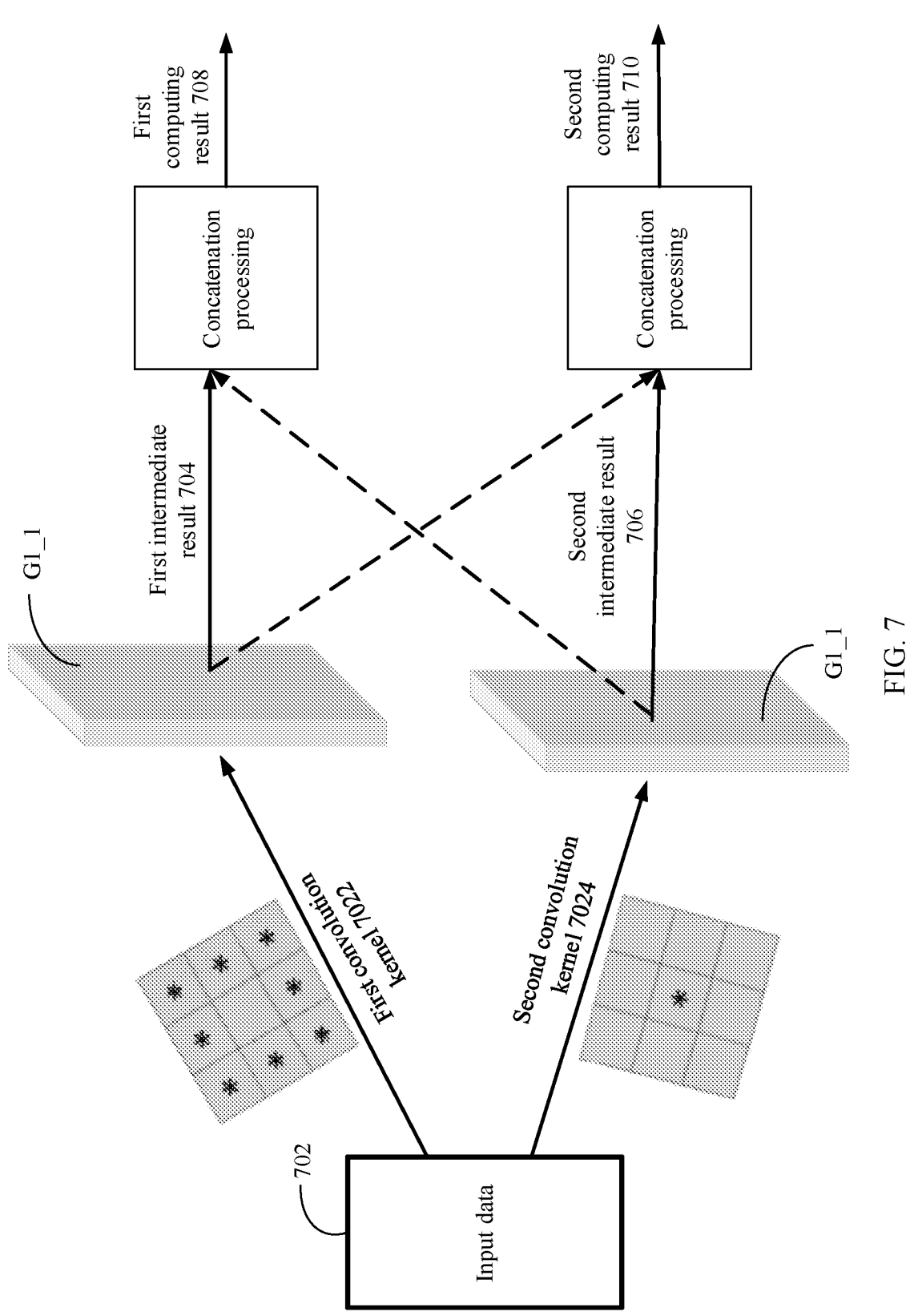
FIG. 7 is a schematic diagram of a center-surround convolution mechanism according to an embodiment of the application.

The following describes how the convolutional module shown in FIG. 6 implements center-surround convolution by using the convolutional layer G1_1 in the convolutional module G1 4051 as an example. FIG. 7 is a schematic diagram of a center-surround convolution mechanism according to an embodiment of the application. It should be noted that, how the convolutional layer G1_1 in the convolutional module G1 4051 implements center-surround convolution is used as an example for schematic illustration in FIG. 7. In actual application, working principles of the convolutional layer G1_2 in the convolutional module G1 4051 and the convolutional layers in the convolutional modules G2 4052 and G3 4053 are similar to that of the convolutional layer G1_1, and reference may be made to the description in FIG. 7.

As shown in FIG. 7, the convolutional layer G1_1 is configured to perform a surround convolution operation on input data 702 based on a first convolution kernel 7022 specified in the convolutional layer G1_1, to simulate on-center bipolar neurons. In addition, the convolutional layer G1_1 is further configured to perform a center convolution operation on the input data 702 based on a second convolution kernel 7024, to simulate off-center bipolar neurons. It can be understood that, in actual application, a first part of computing resources (or computing nodes) that execute the convolutional layer G1_1 may be enabled to perform surround convolution computing, and a second part of computing resources that execute the convolutional layer G1_1 may be enabled to perform center convolution computing in parallel. As shown in FIG. 7, the convolutional layer G1_1 may perform a first convolution operation on the input data based on the first convolution kernel 7022 to obtain a first intermediate result 704. A central-region weight of the first convolution kernel is 0, indicating that no convolution computing is performed on a value corresponding to the central-region weight of the first convolution kernel. For example, as shown in FIG. 7, the first convolution kernel 7022 may be a 3\*3 donut convolution kernel. The first convolution operation may be referred to as a surround convolution operation.

In addition, when performing surround convolution, the convolutional layer G1_1 may further simultaneously perform a second convolution operation on the input data based on the second convolution kernel 7024 to obtain a second intermediate result 706. A central-region weight of the second convolution kernel 7024 is valid, and a surrounded-region weight of the second convolution kernel 7024 may be 0. For example, as shown in FIG. 7, the second convolution kernel may be a 1\*1 center convolution kernel. The second convolution operation may be referred to as a center convolution operation. When the convolutional layer G1_1 performs a center convolution operation, it indicates that convolution computing is performed only on a value corresponding to the central-region weight of the second convolution kernel. In this embodiment of the application, the first convolution kernel 7022 and the second convolution kernel 7024 have a same size, for example, a size of 3\*3. It can be understood that, 3\*3 is merely an example of a size of a convolution kernel. In actual application, the size of a convolution kernel may alternatively be 4\*4, 5\*5, 9\*9, or another size. The size of a convolution kernel is not limited herein. In addition, in actual application, there may be only one value corresponding to a center of the second convolution kernel. In FIG. 7, for schematic illustration of a difference between the first convolution kernel 7022 and the second convolution kernel 7024, a size of the second convolution kernel 7024 by using which G1_1 performs 1\*1 center convolution is provided as 3\*3 as an example. It can be understood that, a side length of a central region of a convolution kernel needs to be less than a side length of the convolution kernel. For example, when a convolution kernel has a size of 3\*3, a central region of the convolution kernel may be one weight located at a center of the convolution kernel. When a convolution kernel has a size of 4\*4, a central region of the convolution kernel may be four weights around a center of the convolution kernel.

Still refer to FIG. 7. After the convolutional layer G1_1 performs 3\*3 donut convolution, the first intermediate result 704 may be obtained. In addition, after the convolutional layer G1_1 performs 1\*1 center convolution in parallel, the second intermediate result 706 may be obtained. Further, concatenation processing may be performed on the first intermediate result 704 and the second intermediate result 706 to obtain the computing result of the convolutional layer G1_1. In this embodiment of the application, the computing result of the convolutional layer G1_1 may include two types: a first computing result 708 and a second computing result 710. The first computing result 708 is a computing result with an enhanced center-surround effect. The second computing result 710 is equivalent to a computing result of performing common 3*3 convolution without an enhanced center-surround effect. Specifically, when the first intermediate result 704 is greater than 0 and the second intermediate result 706 is less than 0, or when the first intermediate result 704 is less than 0 and the second intermediate result 706 is greater than 0, the first computing result 708 is output. When the first intermediate result 704 is greater than 0 and the second intermediate result 706 is greater than 0 or when the first intermediate result 704 is less than 0 and the second intermediate result 706 is less than 0, the second computing result 710 is output.

Refer to FIG. 6. When the convolutional module G1 4051 includes two convolutional layers, after the computing result of the convolutional layer G1_1 is obtained, the computing result of the convolutional layer G1_1 may be sent to the convolutional layer G1_2 for further convolution comput- ing. Similar to the convolutional layer G1_1, after perform- ing surround convolution and center convolution simulta- neously based on a specified convolution kernel, the convolutional layer G1_2 may output the computing result of the convolutional layer G1_2. It can be understood that, when the convolutional module G1 4051 includes only the convolutional layer G1_1 shown in FIG. 6, the computing result of the convolutional layer G1_1 is a computing result of the convolutional module G1 4051. When the convolu- tional module G1 4051 includes the convolutional layers G1_1 and G1_2 shown in FIG. 6, the computing result of the convolutional layer G1_2 is a computing result of the convolutional module G1 4051. It can be understood that, when the convolutional module G1 4051 further includes another convolutional layer, a computing result of a last convolutional layer is a computing result of the convolu- tional module G1 4051.

Refer to FIG. 6. Because the convolutional modules G1 4051, G2 4052, and G3 4053 perform three levels of convolution, input data of the convolutional modules G1 4051. G2 4052, and G3 4053 is different. Specifically, the input data of the convolutional module G1 4051 is the feature data 404 obtained in step 304 and the image data of the target image received in step 302. The input data of the convolutional module G2 4052 is output data of the convo- lutional module G1 4051 (that is, the computing result of the convolutional module G1 4051). The input data of the convolutional module G3 4053 is output data of the convo- lutional module G2 4052 (that is, a computing result of the convolutional module G2 4052).

As described above, working principles of the convolu- tional modules G2 4052 and G3 4053 are similar to that of the convolutional module G1 4051. For the convolutional layers in the convolutional modules G2 4052 and G3 4053, refer to the schematic illustration of the data processing procedure shown in FIG. 7. Specifically, after the computing result of the convolutional module G1 4051 is obtained, the convolutional module G2 4052 may perform second-level center-surround convolution computing on the computing result of the convolutional module G1 4051 based on a specified network parameter. Specifically, the convolutional module G2 4052 may perform a third convolution operation on a computing result of the first-level center-surround convolution based on a third convolution kernel, to obtain a third intermediate result. A central-region value of the third convolution kernel is 0. When performing the third convo- lution operation, the convolutional module G2 4052 may further simultaneously perform a fourth convolution opera- tion on the computing result of the first-level center-sur- round convolution based on a fourth convolution kernel, to obtain a fourth intermediate result. The fourth convolution kernel includes only a central-region weight, and the third convolution kernel and the fourth convolution kernel have a same size. A computing result of the second-level center- surround convolution is obtained based on the third inter- mediate result and the fourth intermediate result.

Similarly, after the computing result of the convolutional module G2 4052 is obtained, the convolutional module G3 4053 may perform third-level center-surround convolution computing on the computing result of the convolutional module G2 4052 based on a specified network parameter. Specifically, the convolutional module G3 4053 may per- form a fifth convolution operation on the computing result of the second-level center-surround convolution based on a fifth convolution kernel, to obtain a fifth intermediate result. A central-region weight of the fifth convolution kernel is 0. When performing the fifth convolution operation, the con- volutional module G3 4053 may further simultaneously perform a sixth convolution operation on the computing result of the second-level center-surround convolution based on a sixth convolution kernel, to obtain a sixth intermediate result. The sixth convolution kernel includes only a central- region weight, and the fifth convolution kernel and the sixth convolution kernel have a same size. In addition, a comput- ing result of the third-level center-surround convolution is obtained based on the fifth intermediate result and the sixth intermediate result.

FIG. 7 uses an example in which both the convolutional modules G2 4052 and G3 4053 include two convolutional layers. As described above, the convolutional modules G2 4052 and G3 4053 each may include one or more convo- lutional layers, and each convolutional layer may perform the foregoing center convolution and surround convolution operations based on different convolution kernels. Similar to the convolutional module G1 4051, the convolutional mod- ule G2 4052 may obtain the computing result of the con- volutional module G2 4052 based on a computing result of the one or more convolutional layers in the convolutional module G2 4052. The convolutional module G3 4053 may also obtain the computing result of the convolutional module G3 4053 based on a computing result of the one or more convolutional layers in the convolutional module G3 4053.

In this embodiment of the application, convolution ker- nels specified in the convolutional layers in the convolu- tional modules G1 4051, G2 4052, and G3 4053 may also be collectively referred to as a network parameter of the feature drifting module 405. The network parameter is obtained after training a plurality of low-quality images, and may be used to indicate the correspondence between feature data of a low-quality image and feature data of a clear image. Convolution kernels of different convolutional layers may be different. In a same convolutional layer, convolution kernels for performing surround convolution and center convolution have a same size. It should be noted that, because the feature drifting module 405 provided in this embodiment of the application is implemented based on a feature drifting pattern of images, the correspondence that is between feature data of a low-quality image and feature data of a clear image and that is indicated by the network parameter, obtained by training, of the feature drifting module 405 is independent of specific content of the images.

Still refer to FIG. 6. After the convolutional layers in the convolutional modules G1 4051, G2 4052, and G3 4053 separately perform the center-surround convolution shown in FIG. 7, the output results of the convolutional modules G1 4051, G2 4052, and G3 4053 may be input to the processing module 4054 for accumulation processing, to obtain the residual data 406 corresponding to the target image. The residual data 406 is used to indicate a deviation between the feature data of the target image and feature data of a clear image. In actual application, the processing module 4054 may also be a convolutional layer, and perform a 1*1 convolution operation on the output results of the convolutional modules G1 4051, G2 4052, and G3 4053 based on weights specified in the processing module 4054. The weights in the processing module 4054 may be set to the weights A1, A2, and A3 in the foregoing formula (3).

In step 308, the enhanced image feature data is obtained based on the residual data and the shallow-layer feature data. Specifically, the enhancement processing module 407 may be used to perform summation processing on the residual data 406 and the shallow-layer feature data 404, to obtain the enhanced image feature data 408. It can be understood that, the enhancement processing module 407 may be implemented by using a summator or a convolutional layer. An implementation of the enhancement processing module 407 is not limited herein.

In step 310, processing is performed on the target image based on the enhanced image feature data to obtain a processing result. Specifically, after the enhanced image feature data 408 is obtained, the enhanced image feature data 408 may be input to the next-layer neural network 409, so that processing is performed on the target image 402 based on the enhanced image feature data 408, to obtain a final processing result of the target image. For example, recognition, classification, detection, and the like may be performed on the target image based on the enhanced image feature data 408.

From the description of the image processing method provided in this embodiment of the application, it can be learned that, in this embodiment of the application, no pre-processing is performed on the low-quality image itself. Instead, in the image processing process, processing is performed on the image data of the low-quality image by using the specified network parameter to obtain the enhanced image feature data of the low-quality image, and processing is performed on the low-quality image based on the enhanced image feature data. The network parameter reflects the correspondence between feature data of a low-quality image and feature data of a clear image. In other words, in the processing process, a relationship between a feature of a low-quality image and a feature of a clear image is used to perform processing on a feature of the low-quality target image. Therefore, recognizability of a network feature can be improved, and a processing effect of the low-quality image can be improved, for example, recognition precision of the low-quality image can be improved.

Further, according to the image processing method provided in this embodiment of the application, a feature drifting attribute of an image is utilized in the image processing process, and processing is performed on a shallow-layer feature of the low-quality image by using the center-surround convolution mechanism constructed based on the structure of the non-classical receptive field of the retina and the light sensation principle of bipolar cells of the retina, to obtain the enhanced image feature data and further perform processing on the low-quality image based on the enhanced image feature data. Because the structure of the non-classical receptive field in the retina is referenced in the processing process and the light sensation principle of bipolar cells of the retina is simulated, there is a function of enhancing high-frequency information in the target image and maintaining low-frequency information in the target image, so that the enhanced image feature data is more easily recognized or extracted, and a processing effect is good, for example, recognition precision of the low-quality image can be improved. In addition, robustness (or stability) of the network can be made strong. Further, in this embodiment of the application, processing is performed on the low-quality image by using the feature drifting attribute of an image. Therefore, the processing process does not need to be monitored by using a semantic signal (used to indicate image content), and a quantity of network parameters is small.

Figure 8:
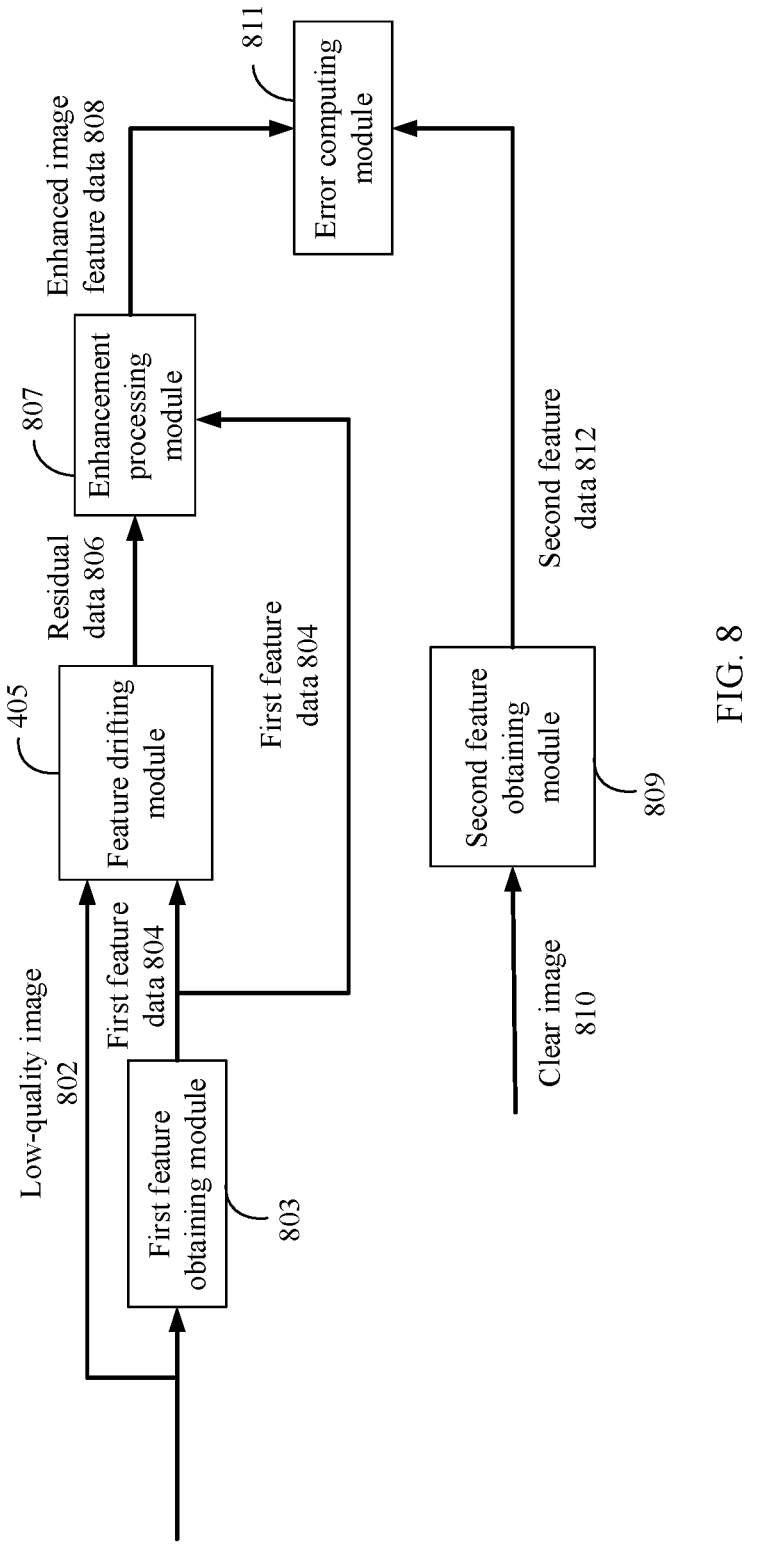
FIG. 8 is a schematic diagram of training of a neural network system according to an embodiment of the application.

As described above, the network parameter of the feature drifting module 405 in this embodiment of the application is obtained by training. The following briefly describes a process of training a network parameter of the feature drifting module 405. FIG. 8 is a schematic diagram of training of a neural network system according to an embodiment of the application. Similar to FIG. 4, a first feature obtaining module 803, a feature drifting module 405, an enhancement processing module 807, a second feature obtaining module 809, and an error computing module 811 shown in FIG. 8 are all logical concepts, and may be neural network computing performed by a neural network device. The feature drifting module 405 is a to-be-trained neural network. It should be noted that, a training process provided in FIG. 8 may be directly performed in the neural network circuit shown in FIG. 1, or may be performed on a device such as a central processing unit (CPU), a graphics processing unit (GPU), or a tensor processing unit (TPU). A training scenario is not limited herein.

In actual application, a plurality of clear images may be selected based on resolutions of the images before training, for example, more than 15 clear images with rich content may be selected. A plurality of low-quality images are generated by using a degraded-image imaging model based on the plurality of selected clear images, to obtain a training set. The plurality of generated low-quality images may include degraded images of various types and various degradation degrees. For example, 15 degradation types may be considered, and each degradation type may include at least 5 degradation degrees. In other words, low-quality images of 15 degradation types may be generated for each clear image, and each degradation type may include at least 5 degradation degrees.

As shown in FIG. 8, in the training process, a low-quality image 802 may be input to the first feature obtaining module 803 to obtain first feature data 804 of the low-quality image 802. The first feature data 804 may include shallow-layer feature data of the low-quality image 802. In addition, a clear image 810 may be input to the second feature obtaining module 809 to obtain second feature data 812 of the clear image 810. The second feature data 812 may include shallow-layer feature data of the clear image 810. Similar to the feature obtaining module 403 shown in FIG. 4, the first feature obtaining module 803 and the second feature obtaining module 809 each may be the first N layers of neural networks in a neural network system, where N is less than a preset threshold. For example, the first feature obtaining module 803 and the second feature obtaining module 809 each may be the first N layers of neural networks on a VGG16 or AlexNet network. VGG16 and AlexNet are two types of network models. For example, in the VGG16 or AlexNet network, feature data output by a first pooling layer "pooling1" and a first convolutional layer "Conv1" may be separately selected as the first feature data 804. In this embodiment of the application, a type of a neural network used to extract feature data of a low-quality image is not limited. In addition, it should be noted that, in this embodiment of the application, a size of an input image and a size of an output feature map are not limited, and may be set based on network and user requirements.

After the first feature data 804 is obtained, the first feature data 804 and image data of the low-quality image 802 may be input to the feature drifting module 405. The feature drifting module 405 may obtain residual data of the trained image data based on the network structure shown in FIG. 6 and the convolution process shown in FIG. 7. For description of the feature drifting module 405, refer to the foregoing step 306 and the description of FIG. 6 and FIG. 7. It can be understood that, a computing process of the training process is similar to a computing process of the foregoing image processing process, except that a value of a network parameter (or referred to as a convolution kernel) specified in each convolutional module shown in FIG. 6 in the training process is different from a value of a network parameter specified in an application process after the training. A purpose of training is to obtain an appropriate network parameter. In the training process, the feature drifting module 405 may first perform processing on the input low-quality image based on a network parameter initially specified in each convolutional module. It can be understood that the network parameter initially specified in the feature drifting module 405 may be obtained in a Gaussian initialization manner, or may be obtained in another initialization manner (for example. Xavier).

After residual data 806 of the low-quality image 802 is obtained with reference to the computing processes shown in FIG. 6 and FIG. 7, the obtained residual data 806 and the first feature data 804 may be input to the enhancement processing module 807 for accumulation processing, to obtain enhanced image feature data 808. The enhancement processing module 807 may be implemented by a summator or a convolutional layer.

Further, the error computing module 811 may compare the enhanced image feature data 808 with the second shallow-layer feature data 812 of the clear image 810 to obtain an error between the enhanced image feature data 808 and the second shallow-layer feature data 812 of the clear image 810. In actual application, the error computing module 811 may compute the error between the enhanced image feature data 808 and the second shallow-layer feature data 812 of the clear image 810 by using a mean square error (MSE) function. After the error is computed, the network parameter in the feature drifting module 405 may be optimized in a gradient back propagation manner based on the computed error. It should be noted that, in a process of adjusting the network parameter based on to the error, a weight in the first feature obtaining module 803 may be kept unchanged, and only the network parameter in the feature drifting module 405 is optimized. In other words, the weight in each convolutional module in the feature drifting module 405 may be adjusted based on the error.

In actual application, after training and learning are performed on the plurality of low-quality images in the training set for a plurality of times, an error obtained by the error computing module 811 may be made less than a preset threshold, so as to obtain a trained network parameter for the feature drifting module 405. In other words, the network parameter of the feature drifting module 405 that is obtained after error convergence may be used as the network parameter of the feature drifting module 405 that is applied in the image processing process.

According to the training method provided in this embodiment of the application, a feature drifting attribute of an image is utilized and no semantic signal is used for monitoring in the training process. Therefore, the feature drifting module 405 obtained after training may be applied to any low-quality image of a same type as the training data. In other words, the network parameter obtained after training in this embodiment of the application may be embedded into an existing neural network to process an input degraded image, and the network parameter does not need to be trained again based on an actual application scenario. In addition, the association between a feature of a low-quality image and a feature of a clear image is used to recognize a low-quality image. Therefore, recognizability of a network feature can be improved, and a processing effect of the low-quality image can be improved, for example, recognition precision of the low-quality image can be improved.

Figure 9:
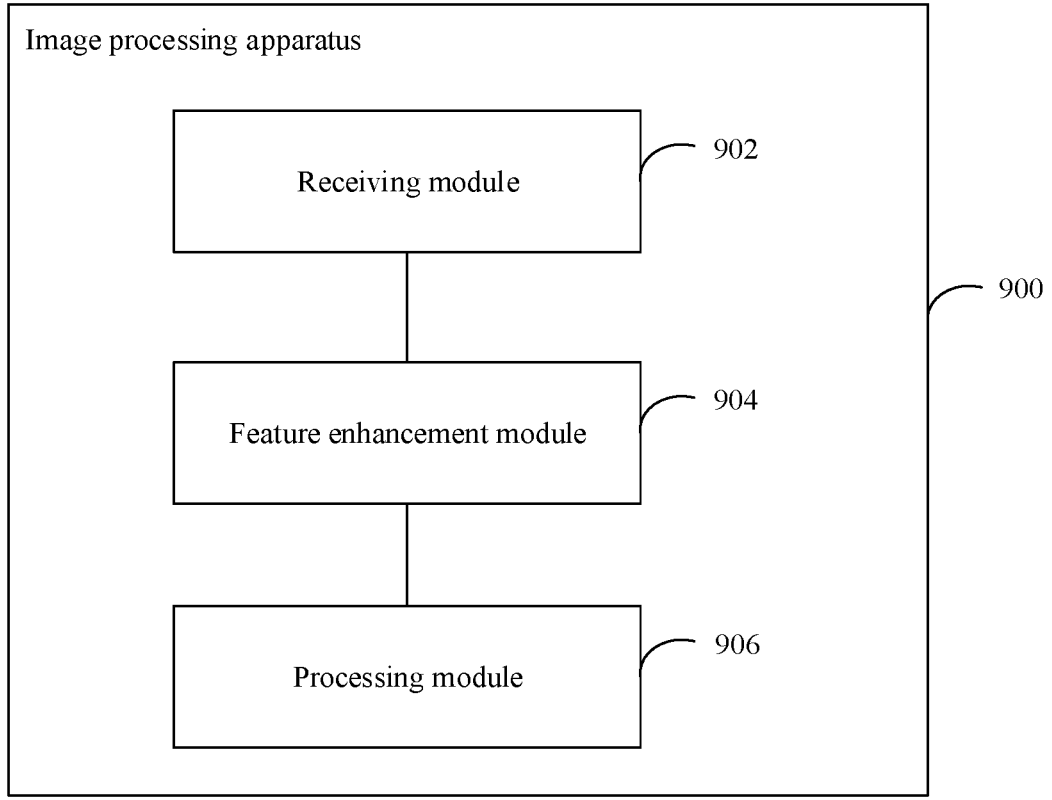
FIG. 9 is a schematic diagram of an image processing apparatus according to an embodiment of the application.

FIG. 9 is a schematic diagram of a structure of another image processing apparatus according to an embodiment of the application. As shown in FIG. 9, an image processing apparatus 900 may include a receiving module 902, a feature enhancement module 904, and a processing module 906. The receiving module 902 is configured to receive image data of a target image, where the target image is a low-quality image. The feature enhancement module 904 is configured to perform processing on the image data based on a network parameter to obtain enhanced image feature data of the target image, where the network parameter is used to indicate a correspondence between feature data of a low-quality image and feature data of a clear image. The processing module 906 is configured to perform processing on the target image based on the enhanced image feature data.

Specifically, the feature enhancement module 904 may obtain feature data of the target image based on the image data: after obtaining the feature data, perform neural network computing on the feature data and the image data based on the network parameter to obtain residual data; and further obtain the enhanced image feature data of the target image based on the residual data and the feature data. The feature data is feature data obtained by performing computing on the image data by using N layers of neural networks, and N is greater than 0 and less than a preset threshold. The residual data is used to indicate a deviation between the feature data of the target image and feature data of a clear image.

In a process of obtaining the enhanced image feature data of the target image, the feature enhancement module 904 is configured to perform center-surround convolution computing on the feature data and the image data based on the network parameter. In an implementation, the feature enhancement module 904 is configured to perform at least first-level center-surround convolution computing, second-level center-surround convolution computing, and third-level center-surround convolution computing on the feature data and the image data based on the specified network parameter. Input data of the first-level center-surround convolution computing includes the feature data and the image data, input data of the second-level center-surround convolution computing includes a computing result of the first-level center-surround convolution computing, and input data of the third-level center-surround convolution computing includes a computing result of the second-level center-surround convolution computing. The feature enhancement module 904 may obtain the residual data based on the computing result of the first-level center-surround convolution computing, the computing result of the second-level center-surround convolution computing, and a computing result of the third-level center-surround convolution computing.

In an implementation, the feature enhancement module 904 may perform a first convolution operation on the feature data and the image data based on a first convolution kernel to obtain a first intermediate result, where a central-region weight of the first convolution kernel is 0. In addition, the feature enhancement module 904 may perform a second convolution operation on the feature data and the image data based on a second convolution kernel to obtain a second intermediate result, where the second convolution kernel includes only a central-region weight, and the first convolution kernel and the second convolution kernel have a same size. Further, the feature enhancement module 904 may obtain the computing result of the first-level center-surround convolution based on the first intermediate result and the second intermediate result.

In an implementation, the feature enhancement module 904 may further perform a third convolution operation on the computing result of the first-level center-surround convolution based on a third convolution kernel to obtain a third intermediate result, where a central-region value of the third convolution kernel is 0. In addition, the feature enhancement module 904 may perform a fourth convolution operation on the computing result of the first-level center-surround convolution based on a fourth convolution kernel to obtain a fourth intermediate result, where the fourth convolution kernel includes only a central-region weight, and the third convolution kernel and the fourth convolution kernel have a same size. In this way: the feature enhancement module 904 may obtain the computing result of the second-level center-surround convolution based on the third intermediate result and the fourth intermediate result.

In an implementation, the feature enhancement module 904 may further perform a fifth convolution operation on the computing result of the second-level center-surround convolution based on a fifth convolution kernel to obtain a fifth intermediate result, where a central-region weight of the fifth convolution kernel is 0. In addition, the feature enhancement module 904 may further perform a sixth convolution operation on the computing result of the second-level center-surround convolution based on a sixth convolution kernel to obtain a sixth intermediate result, where the sixth convolution kernel includes only a central-region weight, and the fifth convolution kernel and the sixth convolution kernel have a same size. Further, the feature enhancement module 904 may obtain the computing result of the third-level center-surround convolution based on the fifth intermediate result and the sixth intermediate result.

The image processing apparatus shown in FIG. 9 performs no pre-processing on the low-quality image itself. Instead, in an image processing process, the image processing apparatus performs processing on the image data of the low-quality image by using the specified network parameter to obtain the enhanced image feature data of the low-quality image, and perform processing on the low-quality image based on the enhanced image feature data. The network parameter reflects the correspondence between feature data of a low-quality image and feature data of a clear image, so that a processing effect of the low-quality target image is better. Specifically, the image processing apparatus provided in this embodiment of the application utilizes a feature drifting attribute of an image, and performs processing on a shallow-layer feature of the low-quality image by using a center-surround convolution mechanism constructed based on a structure of a non-classical receptive field in a retina and a light sensation principle of bipolar cells in the retina, to obtain the enhanced image feature data and further perform processing on the low-quality image based on the enhanced image feature data. In this way, a processing effect of an image is better and recognition precision is higher.

It can be understood that, each module in the image processing apparatus 900 shown in FIG. 9 may be separately located in one or more devices in the image processing apparatus shown in FIG. 1. In this embodiment of the application, some or all of the modules in the embodiment shown in FIG. 9 may be selected based on an actual requirement to achieve an objective of the solution in this embodiment. For parts not described in detail in the embodiment shown in FIG. 9, refer to related description in the embodiments shown in FIG. 1 to FIG. 8.

It can be understood that, the foregoing apparatus embodiment is only illustrative. For example, the division of the modules is merely a logical function division. In actual implementation, there may be another division manner. For example, a plurality of modules or components may be combined or integrated into another system, or some features may be ignored or not executed. In addition, a connection between the modules discussed in the foregoing embodiment may be electrical, mechanical, or in another form. The modules described as separate components may or may not be physically separated. A component displayed as a module may or may not be a physical module. In addition, the functional modules in embodiments of this application may exist independently, or may be integrated into one processing module. For example, the functional modules shown in FIG. 9 may be integrated in the neural network circuit or the processor shown in FIG. 1, and be implemented by corresponding components.

An embodiment of the application further provides a computer program product for data processing, including a computer-readable storage medium stored with program code, where instructions included in the program code are used to execute the method process described in any one of the foregoing method embodiments. Persons of ordinary skill in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or another non-volatile memory.

It should be noted that embodiments provided in this application are merely examples. Persons skilled in the art may clearly know that, for convenience and conciseness of description, in the foregoing embodiments, embodiments emphasize different aspects, and for a part not described in detail in one embodiment, refer to relevant description of another embodiment. Features disclosed in embodiments, claims, and accompanying drawings of the application may exist independently or exist in a combination. Features described in a hardware form in embodiments of the application may be performed by software and vice versa. This is not limited herein.

What is claimed is:

1. An image processing method applied to an image processing apparatus, the method comprising:

receiving image data of a target image, wherein the target image is a low-quality image;

obtaining feature data of the target image based on the image data;

performing center-surround convolution computing on the feature data and the image data based on a network parameter to obtain enhanced image feature data of the target image, wherein the center-surround convolution computing simulates a light sensation principle of bipolar cells in a retina, and wherein the network parameter is used to indicate a correspondence between feature data of a low-quality image and feature data of a clear image; and performing processing on the target image based on the enhanced image feature data.

2. The image processing method according to claim 1, wherein the feature data is obtained by performing computing on the image data by using N layers of neural networks, and N is an integer greater than 0 and less than a preset threshold;

wherein the performing the center-surround convolution computing on the feature data and the image data based on the network parameter to obtain the enhanced image feature data of the target image comprises:

performing neural network computing on the feature data and the image data based on the network parameter to obtain residual data, wherein the residual data is used to indicate a deviation between the feature data of the target image and feature data of a clear image; and obtaining the enhanced image feature data of the target image based on the residual data and the feature data.

3. The image processing method according to claim 2, wherein the performing the neural network computing on the feature data and the image data based on the network parameter comprises:

performing at least first-level center-surround convolution computing, second-level center-surround convolution computing, and third-level center-surround convolution computing on the feature data and the image data based on the network parameter.

4. The image processing method according to claim 3, wherein input data of the first-level center-surround convolution computing comprises: the feature data and the image data, wherein input data of the second-level center-surround convolution computing comprises: a computing result of the first-level center-surround convolution computing, and wherein input data of the third-level center-surround convolution computing comprises: a computing result of the second-level center-surround convolution computing.

5. The image processing method according to claim 3, wherein the residual data is obtained based on a computing result of the first-level center-surround convolution computing, a computing result of the second-level center-surround convolution computing, and a computing result of the third-level center-surround convolution computing.

6. The image processing method according to claim 3, wherein the first-level center-surround convolution computing is used to simulate a response of a central region in a retina of a human eye to the target image, wherein the second-level center-surround convolution computing is used to simulate a response of a surrounded region of the retina of the human eye to the target image, and wherein the third-level center-surround convolution computing is used to simulate a response of a marginal region of the retina of the human eye to the target image.

7. The image processing method according to claim 3, wherein the first-level center-surround convolution computing comprises:

performing a first convolution operation on the feature data and the image data based on a first convolution kernel to obtain a first intermediate result, wherein a central-region weight of the first convolution kernel is 0;

performing a second convolution operation on the feature data and the image data based on a second convolution kernel to obtain a second intermediate result, wherein the second convolution kernel comprises only a central-region weight, and the first convolution kernel and the second convolution kernel have a same size; and obtaining the computing result of the first-level center-surround convolution computing based on the first intermediate result and the second intermediate result.

8. The image processing method according to claim 3, wherein the second-level center-surround convolution computing comprises:

performing a third convolution operation on the computing result of the first-level center-surround convolution computing based on a third convolution kernel to obtain a third intermediate result, wherein a central-region weight of the third convolution kernel is 0;

performing a fourth convolution operation on the computing result of the first-level center-surround convolution computing based on a fourth convolution kernel to obtain a fourth intermediate result, wherein the fourth convolution kernel comprises only a central-region weight, and the third convolution kernel and the fourth convolution kernel have a same size; and obtaining the computing result of the second-level center-surround convolution computing based on the third intermediate result and the fourth intermediate result.

9. The image processing method according to claim 3, wherein the third-level center-surround convolution computing comprises:

performing a fifth convolution operation on the computing result of the second-level center-surround convolution computing based on a fifth convolution kernel to obtain a fifth intermediate result, wherein a central-region weight of the fifth convolution kernel is 0;

performing a sixth convolution operation on the computing result of the second-level center-surround convolution computing based on a sixth convolution kernel to obtain a sixth intermediate result, wherein the sixth convolution kernel comprises only a central-region weight, and the fifth convolution kernel and the sixth convolution kernel have a same size; and obtaining the computing result of the third-level center-surround convolution computing based on the fifth intermediate result and the sixth intermediate result.

10. The image processing method according to claim 1, wherein the image processing apparatus is a neural network device, and the network parameter is obtained by training.

11. An image processing apparatus comprising:

a memory comprising processor-executable instructions; and a processor in communication with the memory, wherein the processor is configured to execute the processor-executable instructions to facilitate the image processing apparatus to:

receive image data of a target image, wherein the target image is a low-quality image;

obtain feature data of the target image based on the image data;

perform center-surround convolution computing on the feature data and the image data based on a network parameter to obtain enhanced image feature data of the target image, wherein the center-surround convolution computing simulates a light sensation principle of bipolar cells in a retina, and wherein the network parameter is used to indicate a correspondence between feature data of a low-quality image and feature data of a clear image; and perform processing on the target image based on the enhanced image feature data.

12. The image processing apparatus according to claim 11, wherein the feature data is obtained by performing computing on the image data by using N layers of neural networks, and N is an integer greater than 0 and less than a preset threshold;

wherein the processor is further configured to execute the processor-executable instructions to facilitate the image processing apparatus to:

perform neural network computing on the feature data and the image data based on the network parameter to obtain residual data, wherein the residual data is used to indicate a deviation between the feature data of the target image and feature data of a clear image; and obtain the enhanced image feature data of the target image based on the residual data and the feature data.

13. The image processing apparatus according to claim 12, wherein the processor is further configured to execute the processor-executable instructions to facilitate the image processing apparatus to: perform at least first-level center-surround convolution computing, second-level center-surround convolution computing, and third-level center-surround convolution computing on the feature data and the image data based on the network parameter.

14. The image processing apparatus according to claim 13, wherein input data of the first-level center-surround convolution computing comprises: the feature data and the image data, wherein input data of the second-level center-surround convolution computing comprises: a computing result of the first-level center-surround convolution computing, and wherein input data of the third-level center-surround convolution computing comprises: a computing result of the second-level center-surround convolution computing.

15. The image processing apparatus according to claim 13, wherein the residual data is obtained based on a computing result of the first-level center-surround convolution computing, a computing result of the second-level center-surround convolution computing, and a computing result of the third-level center-surround convolution computing.

16. The image processing apparatus according to claim 13, wherein the first-level center-surround convolution computing is used to simulate a response of a central region in a retina of a human eye to the target image, wherein the second-level center-surround convolution computing is used to simulate a response of a surrounded region of the retina of the human eye to the target image, and wherein the third-level center-surround convolution computing is used to simulate a response of a marginal region of the retina of the human eye to the target image.

17. The image processing apparatus according to claim 14, wherein the processor is further configured to execute the processor-executable instructions to facilitate the image processing apparatus to:

perform a first convolution operation on the feature data and the image data based on a first convolution kernel to obtain a first intermediate result, wherein a central-region weight of the first convolution kernel is 0;

perform a second convolution operation on the feature data and the image data based on a second convolution kernel to obtain a second intermediate result, wherein the second convolution kernel comprises only a central-region weight, and the first convolution kernel and the second convolution kernel have a same size; and obtain the computing result of the first-level center-surround convolution computing based on the first intermediate result and the second intermediate result.

18. The image processing apparatus according to claim 14, wherein the processor is further configured to execute the processor-executable instructions to facilitate the image processing apparatus to:

perform a third convolution operation on the computing result of the first-level center-surround convolution computing based on a third convolution kernel to obtain a third intermediate result, wherein a central-region value of the third convolution kernel is 0;

perform a fourth convolution operation on the computing result of the first-level center-surround convolution computing based on a fourth convolution kernel to obtain a fourth intermediate result, wherein the fourth convolution kernel comprises only a central-region weight, and the third convolution kernel and the fourth convolution kernel have a same size; and obtain the computing result of the second-level center-surround convolution computing based on the third intermediate result and the fourth intermediate result.

19. The image processing apparatus according to claim 14, wherein the third-level center-surround convolution computing comprises:

performing a fifth convolution operation on the computing result of the second-level center-surround convolution computing based on a fifth convolution kernel to obtain a fifth intermediate result, wherein a central-region weight of the fifth convolution kernel is 0;

performing a sixth convolution operation on the computing result of the second-level center-surround convolution computing based on a sixth convolution kernel to obtain a sixth intermediate result, wherein the sixth convolution kernel comprises only a central-region weight, and the fifth convolution kernel and the sixth convolution kernel have a same size; and obtaining the computing result of the third-level center-surround convolution computing based on the fifth intermediate result and the sixth intermediate result.

20. The image processing apparatus according to claim 11, wherein the image processing apparatus is a neural network device, and the network parameter is obtained by training.

* * * * *